(12) United States Patent
Ni

(10) Patent No.: US 11,761,471 B2
(45) Date of Patent: Sep. 19, 2023

(54) SNAP-IN SOCKET PANEL WITH NIGHT LAMP

(71) Applicant: Enerlites Inc., Irvine, CA (US)

(72) Inventor: Lidong Ni, Zhejiang (CN)

(73) Assignee: Enerlites Inc., Irvine, CA (US)

( * ) Notice: Subject to any disclaimer, the term of this patent is extended or adjusted under 35 U.S.C. 154(b) by 307 days.

(21) Appl. No.: 17/188,376

(22) Filed: Mar. 1, 2021

(65) Prior Publication Data

US 2022/0128078 A1 Apr. 28, 2022

(30) Foreign Application Priority Data

Oct. 26, 2020 (CN) .......................... 202022411232.X

(51) Int. Cl.
| | |
|---|---|
| *F16B 21/08* | (2006.01) |
| *H01R 13/74* | (2006.01) |
| *H02G 3/04* | (2006.01) |
| *H02G 3/14* | (2006.01) |

(52) U.S. Cl.
CPC ......... *F16B 21/086* (2013.01); *H01R 13/741* (2013.01); *H02G 3/14* (2013.01)

(58) Field of Classification Search
CPC ......... F16B 2/22; F16B 21/071; F16B 21/073
See application file for complete search history.

(56) References Cited

U.S. PATENT DOCUMENTS

| | | | |
|---|---|---|---|
| 9,871,324 B2 | 1/2018 | Smith et al. | |
| 9,882,361 B2 | 1/2018 | Smith et al. | |
| 9,917,430 B2 | 3/2018 | Smith et al. | |
| D819,426 S | 6/2018 | Smith et al. | |
| 2018/0301882 A1* | 10/2018 | Smith | H05B 47/19 |

FOREIGN PATENT DOCUMENTS

CN 207368313 U * 5/2018

* cited by examiner

*Primary Examiner* — Jean F Duverne
(74) *Attorney, Agent, or Firm* — Ziegler IP Law Group

(57) ABSTRACT

A snap-in socket panel with a night lamp includes a first panel, a second panel, a resilient sheet bracket arranged vertically to the flat portion, and a resilient sheet connected to the resilient sheet bracket by a plug-in structure. The plug-in structure includes a slot provided on the resilient sheet bracket and an insertion block provided on the resilient sheet. The opening direction of the slot is set towards the first panel. During assembly, the insertion block on the resilient sheet is inserted into the slot on the resilient sheet bracket from bottom to top, to connect the resilient sheet and the resilient sheet bracket, and then connect the second panel to the first panel. The second panel can block the opening of the slot, thereby preventing the resilient sheet from falling out. The socket panel has fewer components, a simple structure, and faster, more convenient assembly.

9 Claims, 8 Drawing Sheets

SNAP-IN SOCKET PANEL WITH NIGHT LAMP

FIELD

The aspects of the disclosed embodiments relate to the technical field of socket panels, and specifically to a snap-in socket panel with a night lamp.

BACKGROUND

Socket panels are commonly found on the walls of residential interiors or office buildings, and they are used to provide 110V or 220V city power to various types of industrial or household appliances through standardized sockets.

The Chinese patent document CN207368313U in the prior art discloses a socket panel, as shown in FIG. 8, including panel bottom cover 01, resilient sheet bracket 02, and panel top cover 03. Support convex bases 011 are installed symmetrically on the inner side of panel bottom cover 01; resilient sheet bracket 02 is inserted on support convex base 011; panel top cover 03 is buckled on panel bottom cover 01; cover flange 031 is provided on the panel top cover; resilient sheet bracket 02 falls into the cover flange 031. When assembling, resilient sheet bracket 02 is inserted to support convex base 011 on panel bottom cover 01, and then cover flange 031 on panel top cover 03 is aligned with resilient sheet bracket 02 and inserted, so as to cover main resilient sheet bracket 02. The above socket panel has a large number of components, a relatively complex structure, high production cost, and time-consuming and labor-intensive assembly.

SUMMARY

Therefore, the technical problem to be solved by this utility model is to overcome the defects of a large number of components, a relatively complex structure, high production cost, and time-consuming and labor-intensive assembly in the prior art, so as to provide a snap-in socket panel with a night lamp with a small number of parts and a simple structure.

Hence, this utility model provides a snap-in socket panel with a night lamp, including: a first panel; a second panel having a flat portion fixedly connected to the first panel, and a resilient sheet bracket arranged vertically to the flat portion; and a resilient sheet fixedly connected to the resilient sheet bracket by means of a plug-in structure, wherein the plug-in structure includes a slot provided on the resilient sheet bracket, and an insertion block provided on the resilient sheet and adaptively pluggable to the slot, wherein the opening direction of the slot is set towards the first panel.

The resilient sheet is connected to the resilient sheet bracket via a positioning structure. The positioning structure includes a positioning groove provided on the resilient sheet and a positioning block provided on the resilient sheet bracket and adaptively pluggable to the positioning groove.

The bottom surface of the insertion block abuts against the bottom wall of the slot, and a clamping foot extending towards the top wall of the slot and abutting against the top wall is formed on the top surface of the insertion block.

The flat portion is fixedly connected to the first panel via a fastener, the fastener being a rivet or a latch.

Multiple rows of frames are formed on the first panel, one side of the frame extends to the flat portion, and the other side extends to the edge of the first panel.

The snap-in socket panel with a night lamp further includes a third panel connected to the first panel via a buckle structure, the buckle structure including a card slot arranged on the first panel or the third panel, and a card block arranged on the other one and adaptively clamped to the card slot.

At least one night lamp is provided on edges of the second panel and the third panel.

The flat portion and the first panel are opposite to form an installation cavity, the bottom of the resilient sheet is formed with a connection portion to be adaptively inserted into an installation cavity, and the connection portion is connected to the night lamp via a wire.

The resilient sheet has resilient arms connected in sequence, a circular movable contact blade that can elastically abut against a socket connection terminal, and a bending part bent from the movable contact blade towards the resilient sheet bracket, wherein the circular movable contact blade has a bulge protruding toward the socket connection terminal.

The resilient sheet bracket has a relief groove provided for the movement of the bending part.

The technical solution of the utility model has the following advantages:

1. This utility model provides a snap-in socket panel with a night lamp, including a first panel; a second panel having a flat portion fixedly connected to the first panel, and a resilient sheet bracket provided vertically to the flat portion; and a resilient sheet fixedly connected to the resilient sheet bracket by means of a plug-in structure, wherein the plug-in structure includes a slot provided on the resilient sheet bracket and an insertion block that is provided on the resilient sheet and is adaptable and pluggable to the slot, where the opening direction of the slot is set towards the first panel. Since the resilient sheet bracket is integrally formed on the second panel, during assembly, the insertion block on the resilient sheet is inserted into the slot on the resilient sheet bracket from bottom to top, so as to fixedly connect the resilient sheet and the resilient sheet bracket, and then fixedly connect the second panel to the first panel. The second panel can block the opening of the slot, thereby preventing the resilient sheet from falling out. Compared with an installation method in which the resilient sheet bracket is first inserted into the support convex base of the panel base, and then the cover flange of the panel top cover is aligned with the resilient sheet bracket and inserted in the prior art, this socket panel has a small number of components, a simple structure, and faster and more convenient assembly.

2. In the snap-in socket panel with a night lamp provided by this utility model, the resilient sheet is connected to the resilient sheet bracket via a positioning structure, the positioning structure includes a positioning groove provided on the resilient sheet, and a positioning block provided on the resilient sheet bracket and is adaptable and pluggable to the positioning groove. The positioning structure can limit an installation position of the resilient sheet and prevent the resilient sheet from detaching from the resilient sheet bracket. The cooperating positioning groove and positioning block have an advantage of simple structures.

3. In the snap-in socket panel with a night lamp provided by this utility model, the bottom surface of the insertion block abuts against the bottom wall of the slot, and a clamping foot extending towards the top wall of the slot and abutting against the top wall is formed on the top surface of the insertion block, which can make the fixation between the resilient sheet and the resilient sheet bracket stronger.

4. Multiple rows of frames are formed on the first panel, one side of the frame extends to the flat portion, and the other side extends to the edge of the first panel. Multiple rows of frames can greatly increase the strength of the overall structure and make it difficult to damage.

5. The snap-in socket panel with a night lamp provided by this utility model further includes a third panel connected to the first panel via a buckle structure, the buckle structure including a card slot arranged on the side of the first panel and the third panel, and a card block arranged on the other side and adaptable and clamped to the card slot. The first panel and the third panel are connected by means of a buckle, which is quick and convenient to disassemble and assemble, and the fitting block and the card slot have advantages of simple structures.

6. In the snap-in socket panel with a night lamp provided by this utility model, the flat portion and the first panel are opposite to form an installation cavity, and the bottom of the resilient sheet is formed with the connection portion suitable for insertion into the installation cavity. The connection portion is connected to the night lamp by a wire, which can reduce installation space occupied by the wire on the socket panel.

7. In the snap-in socket panel with a night lamp provided by this utility model, the resilient sheet has resilient arms connected in sequence, a circular movable contact blade that can elastically abut against a socket connection terminal, and a bending part bent from the movable contact blade towards the resilient sheet bracket, wherein the circular movable contact blade has a bulge protruding toward the socket connection terminal. The circular movable contact blade can increase the contact area between the resilient sheet and the socket terminal. The circular movable contact blade and the bulge can make the resilient sheet contact the terminal more fully. In addition, the bending piece can prevent the socket from hooking on the resilient arm when the socket is separated from the socket panel, causing damage to the resilient arm.

8. In the snap-in socket panel with a night lamp provided by this utility model, the resilient sheet bracket has a relief groove provided for the movement of the bending part. In this way, when the socket panel is installed with a socket, the range of force deformation of the resilient arm is greatly increased.

BRIEF DESCRIPTION OF THE DRAWINGS

In order to more clearly illustrate the embodiments of this utility model or the technical solutions in the prior art, the drawings that must be used in the embodiments or the description of the prior art are simply introduced below. The drawings in the following description are some embodiments of this utility model. For those of ordinary skill in the art, other drawings can be obtained based on these drawings without inventive efforts.

Figure 1:
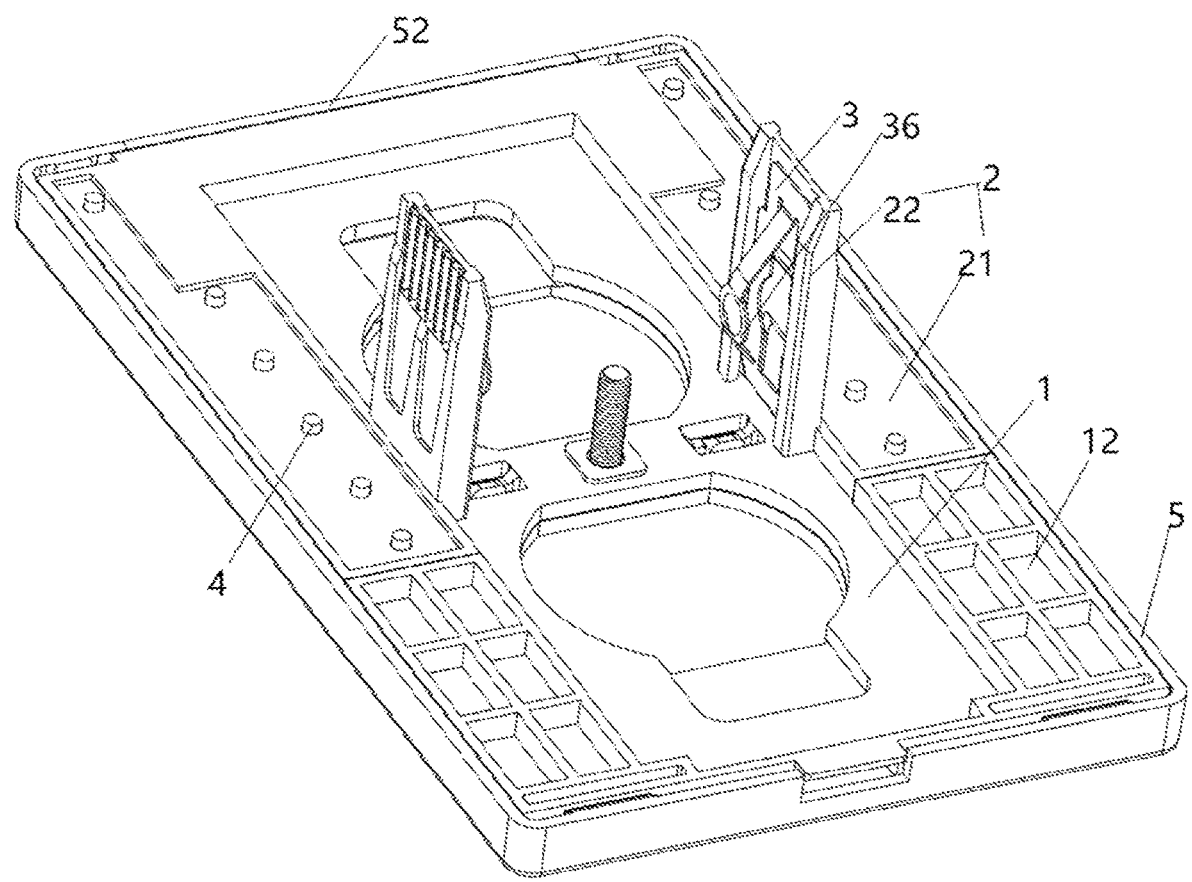
FIG. 1 is a three-dimensional view of a snap-in socket panel with a night lamp of the utility model.

Description of drawing marks: 01. panel bottom cover; 011. support convex base; 02. resilient sheet bracket; 03. panel top cover; 031. cover flange; 1. first panel; 11. card slot; 12. frame; 2. second panel; 21. flat portion; 22. resilient sheet bracket; 23. slot; 24. positioning block; 25. installation cavity; 26. relief groove; 3. resilient sheet; 31. insertion block; 32. positioning groove; 33. clamping foot; 34. connection portion; 35. resilient arm; 36. movable contact blade; 37. bending part; 38. bulge; 4. fastener; 5. third panel; 51. card block; 52. night lamp.

DETAILED DESCRIPTION OF EMBODIMENTS

The technical solution of this utility model will be described clearly and completely below in combination with the accompanying drawings. Apparently, the described embodiments are part of the embodiments of this utility model, rather than all of them. Based on the embodiments of this utility model, all other embodiments obtained by those of ordinary skill in the art without inventive efforts shall fall within the protection scope of this utility model.

In the description of the present utility model, it should be noted that orientations or positional relationships indicated by terms "center," "upper," "lower," "left," "right," "vertical," "horizontal," "inner," "outer" is based on the orientations or positional relationships shown in the drawings are merely used to facilitate the description of this utility model and simplify the description, rather than indicating or implying that the pointed device or element must have a specific orientation, be constructed and operated in a specific orientation, which, therefore, cannot be understood as a limitation of the present utility model. In addition, the terms "first," "second," and "third" are only used for descriptive purposes and cannot be understood as indicating or implying relative importance.

In the description of the present utility model, it should be noted that, unless otherwise clearly specified and limited, the terms "installation" and "connection" should be understood in a broad sense. For example, it can be a fixed connection, a detachable connection, or an integral connection; it can be a mechanical connection or an electrical connection; it can be directly connected, or indirectly connected through an intermediate medium, or internal communication between two components. For those of ordinary skill in the art, the specific meaning of the above-mentioned terms in this utility model can be understood under specific circumstances.

In addition, the technical features involved in different embodiments of this utility model described below can be combined with each other so long as they do not conflict.

Embodiments

This embodiment provides a snap-in socket panel with a night lamp, as shown in FIG. 1, including first panel 1, second panel 2, third panel 5, and resilient sheet 3.

Figure 3:
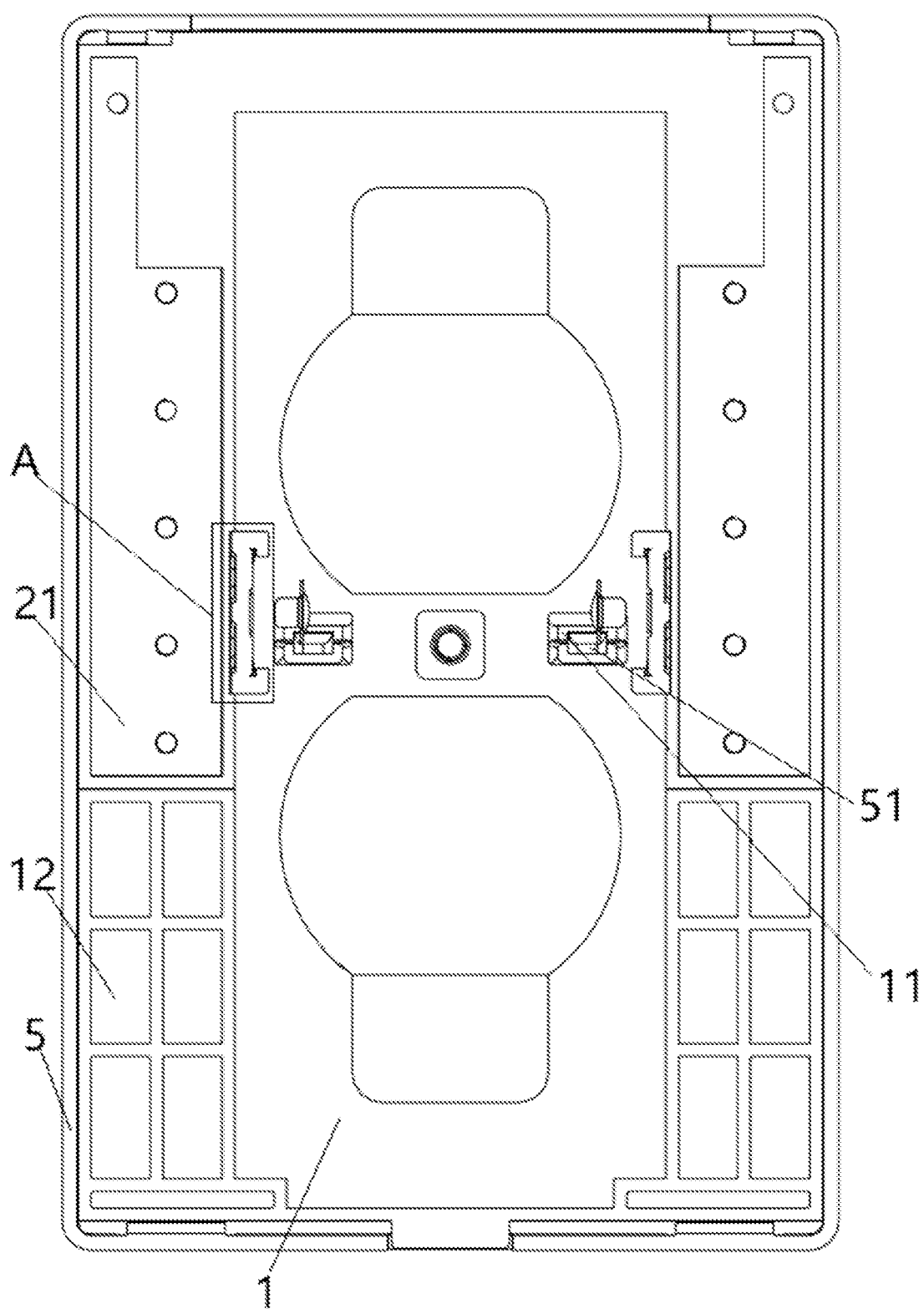
FIG. 3 is a sectional view of FIG. 1.
Figure 4:
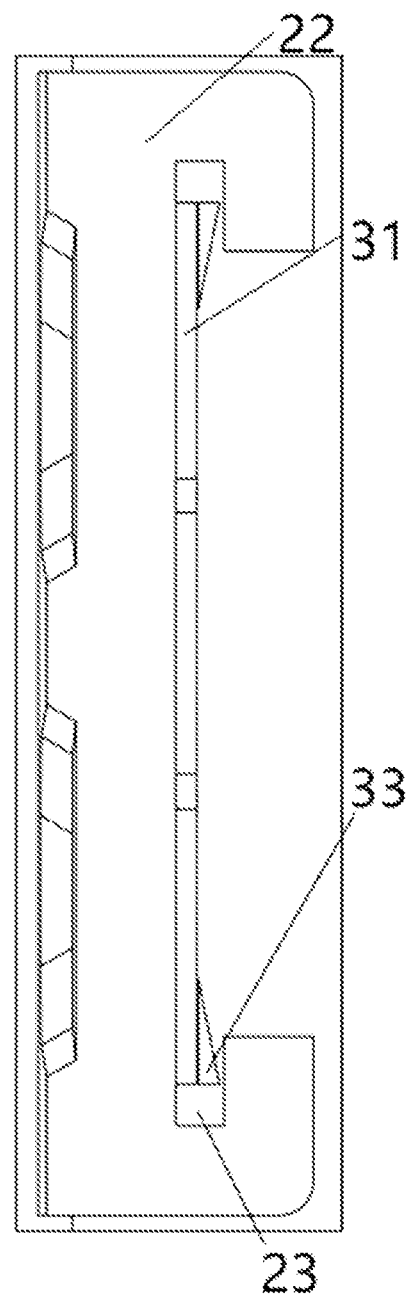
FIG. 4 is an enlarged schematic diagram of the structure of part A in FIG. 3.
Figure 5:
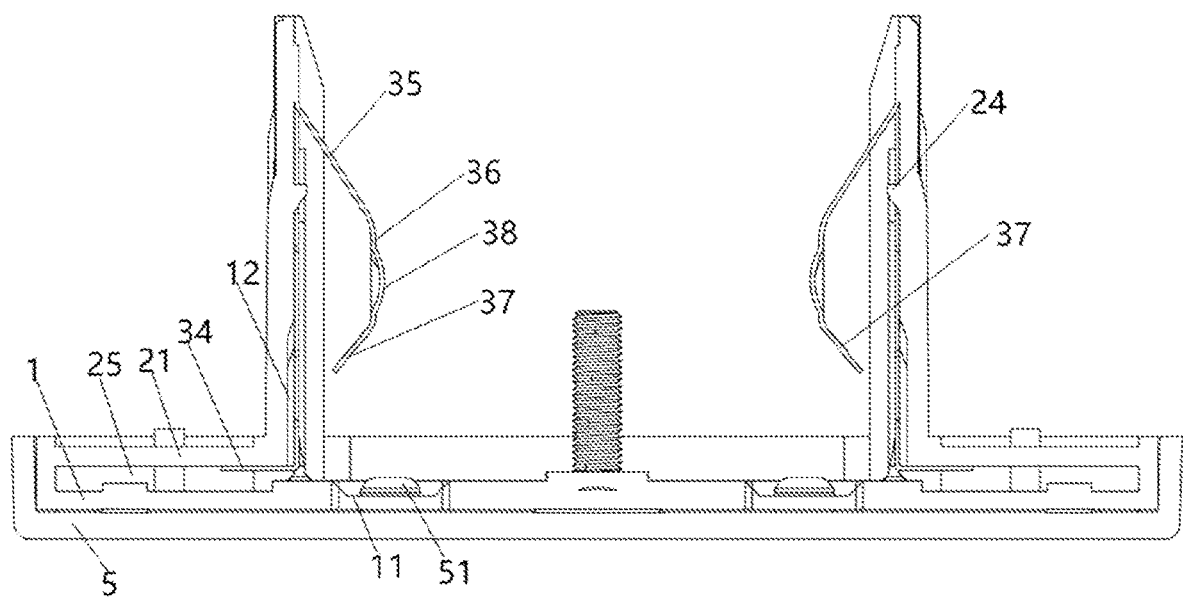
FIG. 5 is a sectional view of FIG. 1 from another perspective.
Figure 6:
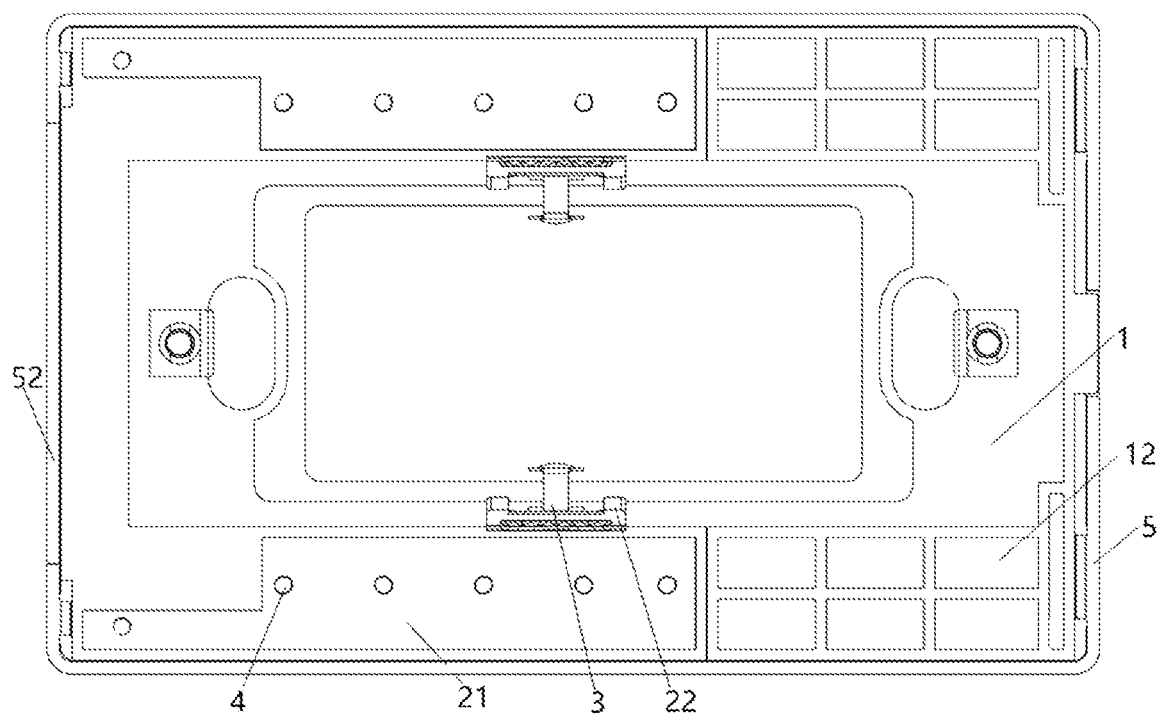
FIG. 6 is a top view of another structure of FIG. 1.
Figure 7:
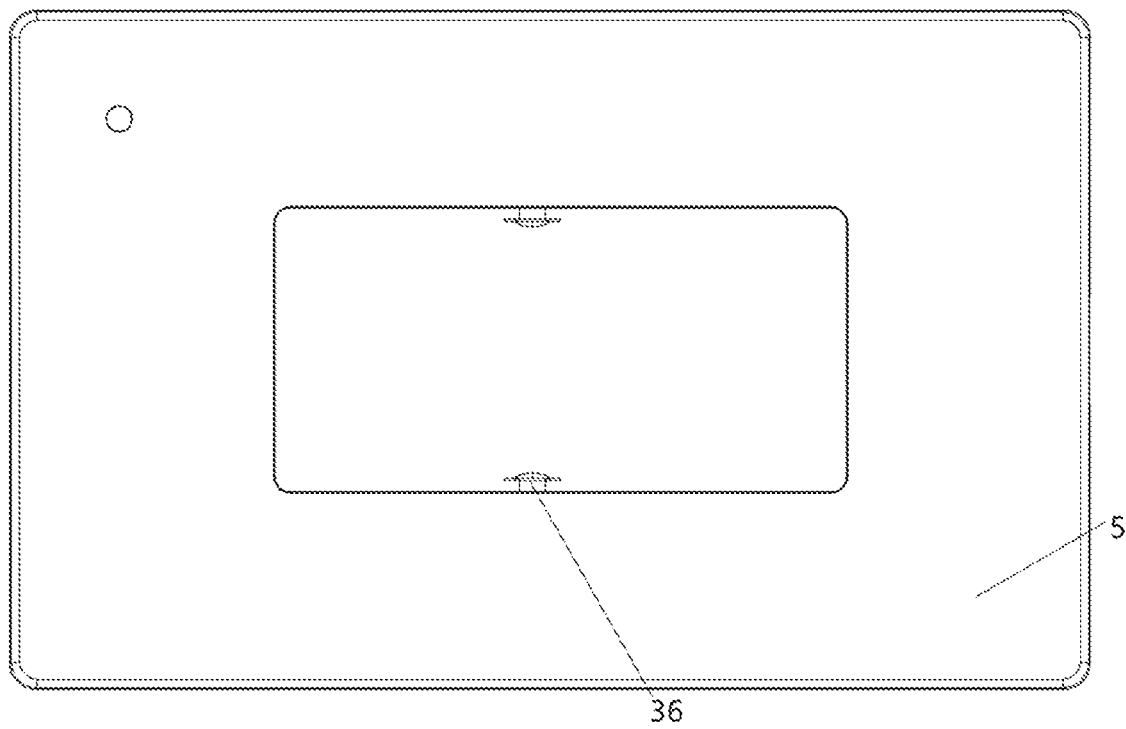
FIG. 7 is a rear view of FIG. 6.
Figure 8:
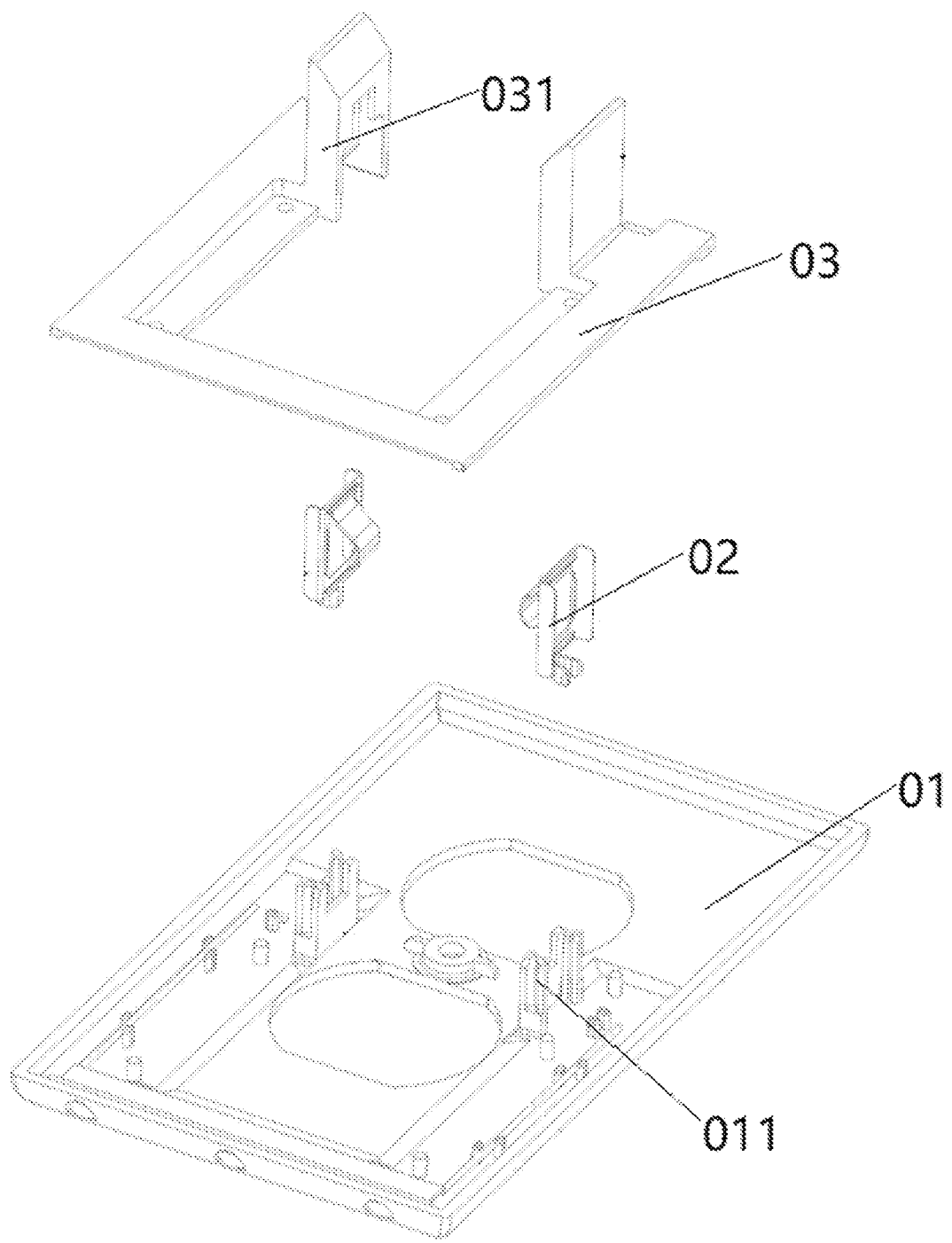
FIG. 8 is an exploded view of a socket panel in the prior art.

Regarding first panel 1, as shown in FIGS. 1, 3, and 5, card slot 11 is provided on first panel 1. Multiple rows of frames 12 are formed on first panel 1, one side of frame 12 extends to flat portion 21, and the other side extends to the edge of first panel 1.

Second panel 2, as shown in FIGS. 2-5, has flat portion 21 fixedly connected to first panel 1, and resilient sheet bracket 22 arranged vertically to flat portion 21. Slot 23 is provided on resilient sheet bracket 22, and the opening direction of slot 23 is set towards first panel 1. Positioning block 24 is provided on resilient sheet bracket 22, and flat portion 21 is fixedly connected to second panel 2 via fastener 4. In this embodiment, fastener 4 is a rivet. Resilient sheet bracket 22 has relief groove 26 provided for the movement of bending part 37, and flat portion 21 and first panel 1 are opposite to form installation cavity 25.

Figure 2:
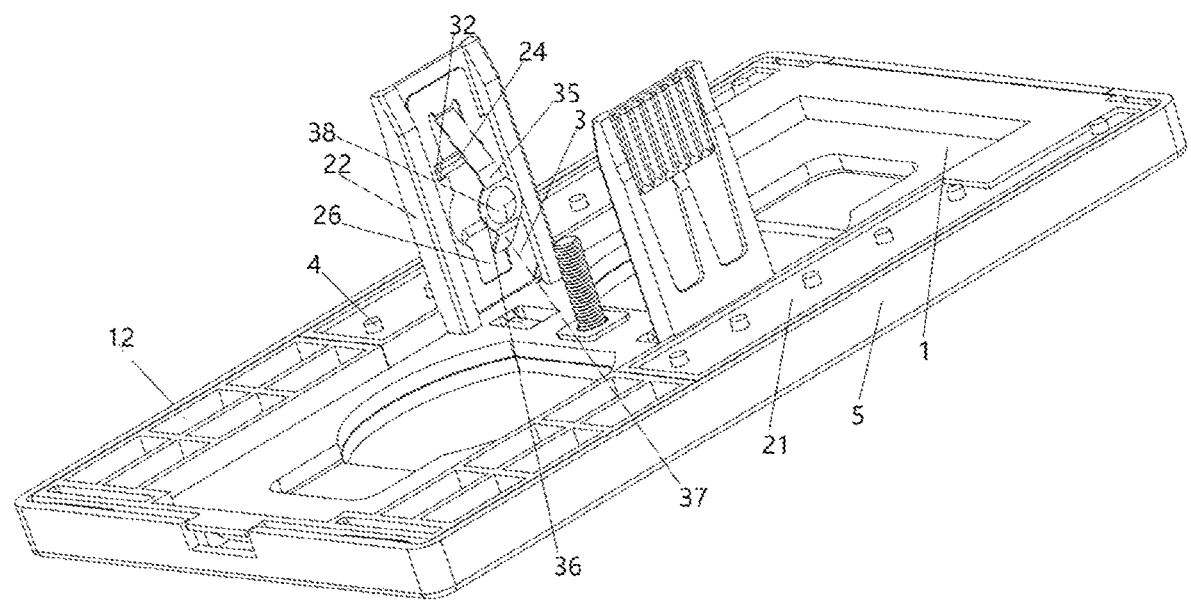
FIG. 2 is a three-dimensional view of FIG. 1 from another perspective.

Regarding third panel 5, as shown in FIGS. 2, 3, and 5, card block 51 adaptively clamped to card slot 11 is provided on third panel 5, and at least one night lamp 52 is provided on edges of second panel 2 and third panel 5.

Regarding resilient sheet 3, as shown in FIGS. 2-5, insertion block 31 adaptively pluggable to slot 23 is provided on resilient sheet 3, and positioning groove 32 adaptively connected to positioning block 24 is provided on resilient sheet 3. The bottom surface of insertion block 31 abuts against the bottom wall of slot 23, and clamping foot 33 extending towards the top wall of slot 23 and abutting against the top wall is formed on the top surface of the insertion block. The bottom of resilient sheet 3 is formed with connection portion 34 adaptive to be inserted into installation cavity 25, and connection portion 34 is connected to night lamp 52 via a wire. Resilient sheet 3 has resilient arms 35 connected in sequence, circular movable contact blade 36 that can elastically abut against a socket connection terminal, and bending part 37 bent from movable contact blade 36 towards resilient sheet bracket 22, wherein circular movable contact blade 36 has bulge 38 protruding toward the socket connection terminal.

As an alternative embodiment, fastener 4 is a latch.

As an alternative embodiment, card slot 11 is provided on third panel 5, and card block 51 is provided on first panel 1.

A snap-in socket panel with a night lamp provided by this utility model includes first panel 1, second panel 2, and resilient sheet 3. Second panel 2 has flat portion 21 fixedly connected to first panel 1, and resilient sheet bracket 22 provided vertically to flat portion 21. Resilient sheet 3 is fixedly connected to resilient sheet bracket 22 by means of a plug-in structure, wherein the plug-in structure includes slot 23 provided on resilient sheet bracket 22 and insertion block 31 provided on resilient sheet 3 and adaptively pluggable to slot 23, wherein the opening direction of slot 23 is set towards first panel 1. Since resilient sheet bracket 22 is integrally formed on second panel 2, during assembly, insertion block 31 on resilient sheet 3 is inserted into slot 23 on resilient sheet bracket 22 from bottom to top, so as to fixedly connect resilient sheet 3 and resilient sheet bracket 22, and then fixedly connect second panel 2 to first panel 1. Second panel 2 can block the opening of slot 23, thereby preventing resilient sheet 3 from falling out. Compared with an installation method in which resilient sheet bracket 02 is first inserted into support convex base 011 of panel base 01, and then cover flange 031 of panel top cover 03 is aligned with resilient sheet bracket 02 and inserted in the prior art, this socket panel has a small number of components, a simple structure, and faster and more convenient assembly.

Apparently, the foregoing embodiments are merely examples for clear description, and are not intended to limit the implementation manners. For those of ordinary skill in the art, other changes or modifications in different forms can be made on the basis of the above description. There is no need and no method to provide an exhaustive list of all implementation manners. The obvious changes or modifications derived herein are still within the protection scope of this utility model.

The invention claimed is:

1. A snap-in socket panel with a night lamp, comprising:
a first panel;
a second panel having a flat portion fixedly connected to the first panel, and a resilient sheet bracket arranged vertically to the flat portion;
a resilient sheet fixedly connected to the resilient sheet bracket by means of a plug-in structure, wherein the plug-in structure comprises a slot provided on the resilient sheet bracket, and an insertion block provided on the resilient sheet and adaptively pluggable to the slot, wherein the opening direction of the slot is set towards the first panel; and
a third panel connected to the first panel via a buckle structure, the buckle structure comprising a card slot arranged on one of the first panel or the third panel, and a card block arranged on an other one of the first panel or the third panel and adaptively clamped to card slot.

2. The snap-in socket panel with a night lamp according to claim 1, wherein the resilient sheet is connected to the resilient sheet bracket via a positioning structure, wherein the positioning structure comprises positioning a groove provided on the resilient sheet, and a positioning block provided on resilient sheet bracket and adaptively pluggable to the positioning groove.

3. The snap-in socket panel with a night lamp according to claim 2, wherein a bottom surface of insertion block abuts against a bottom wall of the slot, and a clamping foot extending towards a top wall of the slot and abutting against the top wall is formed on a top surface of the insertion block.

4. The snap-in socket panel with a night lamp according to claim 1, wherein the flat portion is fixedly connected to the first panel via a fastener, the fastener being a rivet or a latch.

5. The snap-in socket panel with a night lamp according to claim 4, wherein multiple rows of frames are formed on the first panel, wherein one side of the frame extends to the flat portion, and an other side of the frame extends to an edge of first panel.

6. The snap-in socket panel with a night lamp according to claim 1, wherein at least one night lamp is provided on edges of the second panel and the third panel.

7. The snap-in socket panel with a night lamp according to claim 6, wherein the flat portion and the first panel are opposite to form installation cavity, wherein a bottom of the resilient sheet is formed with a connection portion to be adaptively inserted into the installation cavity, and the connection portion is connected to the night lamp via a wire.

8. The snap-in socket panel with a night lamp according to claim 7, wherein the resilient sheet has resilient arms connected in sequence, a circular movable contact blade that can elastically abut against a socket connection terminal, and a bending part bent from a movable contact blade towards the resilient sheet bracket, wherein the circular movable contact blade has a bulge protruding toward the socket connection terminal.

9. The snap-in socket panel with a night lamp according to claim 8, wherein the resilient sheet bracket has a relief groove provided for movement of the bending part.

* * * * *